T. BROWN.
MANURE SPREADER.
APPLICATION FILED MAY 1, 1908.

944,479.

Patented Dec. 28, 1909.
2 SHEETS—SHEET 1.

Witnesses
A. D. Tolman
Penelope Comberbach

Inventor
Theophilus Brown.
By Rufus B. Fowler
Attorney

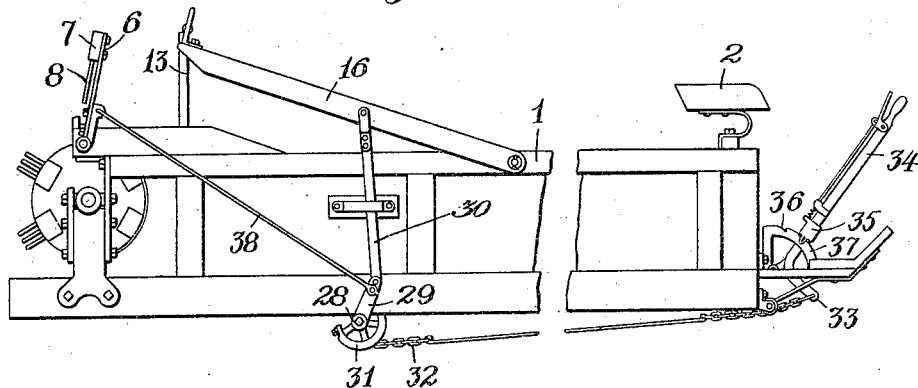
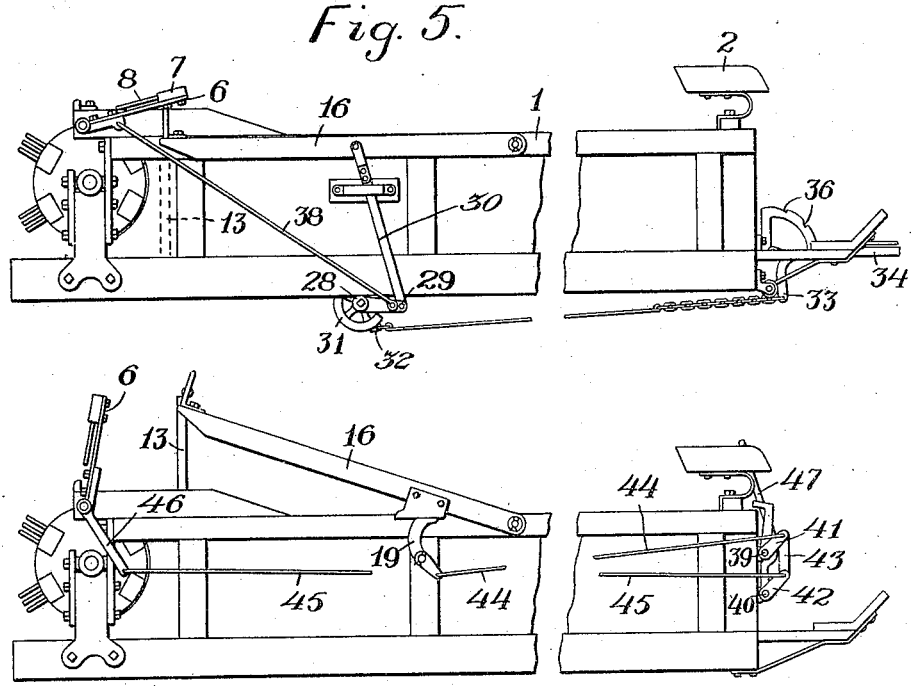

UNITED STATES PATENT OFFICE.

THEOPHILUS BROWN, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

MANURE-SPREADER.

944,479.   Specification of Letters Patent.   Patented Dec. 28, 1909.

Application filed May 1, 1908. Serial No. 430,254.

*To all whom it may concern:*

Be it known that I, THEOPHILUS BROWN, a citizen of the United States, residing at Worcester, in the county of Worcester and Commonwealth of Massachusetts, have invented a new and useful Improvement in Manure-Spreaders, of which the following is a specification, accompanied by drawings forming a part of the same, in which—

Figure 1:
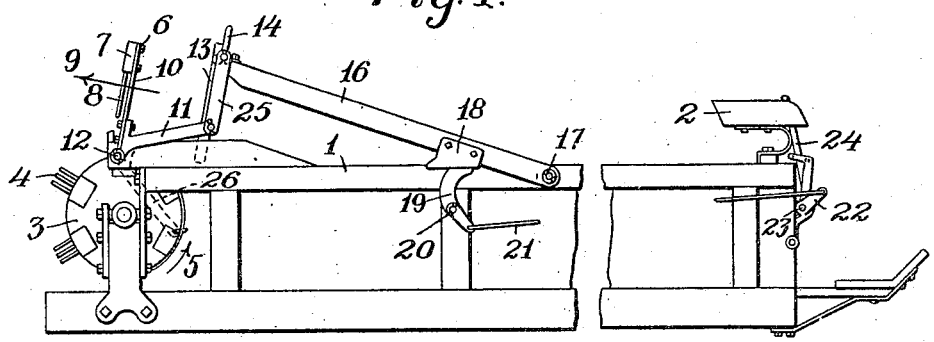
Figure 2:
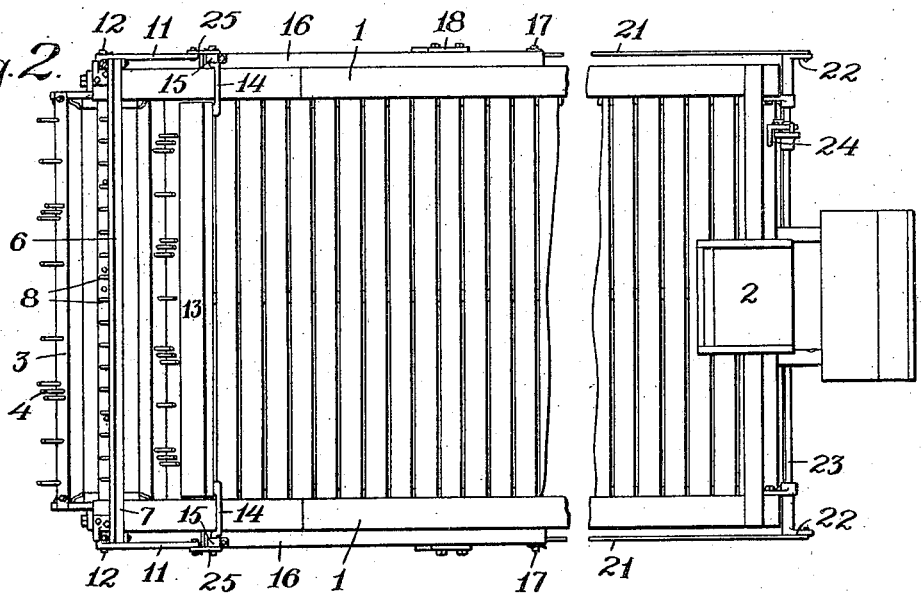
Figure 3:
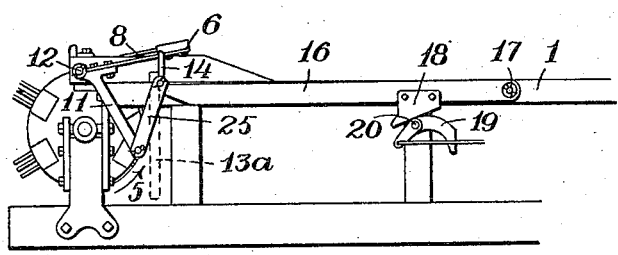

Figure 1 is a side view of the body of a manure spreader showing the beater, rake and tailboard, and such actuating parts as are employed in throwing the tailboard and rake into and out of operative position. Fig. 2 is a top view of the same, and Fig. 3 is a side view of the rear portion of the body showing the rake and tailboard in changed positions from those represented in Fig. 1. Fig. 1 shows the rake in operative position and the tailboard in inoperative position, and Fig. 3 shows the tailboard in operative position and the rake in inoperative position. Figs. 4, 5 and 6 represent side views of the body of a manure spreader showing modified forms of construction, whereby the tailboard and rake are operatively connected in order that they may be raised or lowered by the action of a single lever handle.

Similar reference letters and figures refer to similar parts in the different views.

My present invention relates to the pulverizing rake of a manure spreader, and it has for its objects to provide a movable rake capable of being maintained in its most effective position above the beater during the operation of the spreader, and to be moved out of its operative position to facilitate the loading of the spreader, and further to produce a simultaneous movement of the rake and tailboard by means of a single hand lever, whereby, by one movement of the lever, the tailboard may be raised and the rake brought into operative position and, by a reverse movement of the hand lever, the tailboard and rake may be simultaneously lowered, thereby swinging the tailboard into operative position to prevent the load from crowding against the beater, and depressing the rake to allow manure to be thrown over it from the rear of the spreader in the process of loading. The above objects I accomplish by means of the construction and arrangement of parts as hereinafter described and pointed out in the annexed claims.

In the accompanying drawings I have shown only such parts of a manure spreader as are necessary to illustrate the character and operation of my present invention, viz., the body, beater, pulverizing rake, movable tailboard, and the mechanism for changing the position of the rake and tailboard.

Referring to the accompanying drawings 1 denotes the body of a manure spreader, having a seat 2 mounted on the front end thereof for the driver and having at its rear end a rotatable beater 3 provided with teeth 4, whereby the load of manure as it crowds against the beater, which revolves in the direction of the arrow 5, is picked up by the teeth 4 and thrown broadcast at the rear of the spreader in the manner common in machines of this class, which will be well understood by those conversant with manure spreaders without further detailed description.

In order to pulverize the manure and enable the machine to distribute it more evenly over the surface of the ground, I mount a pulverizing rake 6 substantially vertical above the axis of the beater. The pulverizing rake consists of a bar 7 extending transversely across the body of the spreader, from the lower edge of which project a series of teeth 8. Preferably the teeth 8 should be capable of a slight yielding motion in the direction of the arrow 9, Fig. 1, and this may be secured by any convenient means, in the present instance, by mounting the bar 7 upon yielding or elastic arms 10 attached by bolts to levers 11, pivoted upon studs 12 held by the opposite sides of the body and having coincident axes, so that the rake 6 and levers 11 are capable of swinging freely about the studs 12.

A tailboard 13 extends transversely across the body directly in front of the beater 3, and is capable of being raised in an elevated position, as shown in Fig. 1, in order to allow the load of manure to be brought into contact with the rotating beater, or to be lowered into the position shown by the broken lines 13ª, Fig. 3, by which the load is kept from crowding against the beater. The tailboard 13 is attached at its upper corners to bent arms 14, which are pivoted in lugs 15 attached to the rear ends of levers 16, 16. The levers 16 are pivoted at their forward ends upon studs 17 to the body of the spreader, and attached to the levers 16 are lifting plates 18 which are acted upon by swinging cam levers 19, pivoted upon the side of the body at 20 and connected by rods 21 with radial arms 22, carried upon a rocking shaft 23 extending transversely across the forward end of the body, and adapted to be rocked from the driver's seat by means of a hand lever 24, thereby enabling the driver, by a single movement of the hand lever 24, to raise the tailboard into the position shown in Fig. 1, or to lower it into the position shown in Fig. 3 by the reverse movement of the hand lever.

The construction and operation of the tailboard 13, as above described, form no part of my present invention, as they are substantially like that shown and described in United States Letters Patent No. 632,124, issued August 29, 1899, to Joseph F. Kemp, and the method of raising the levers 16 by means of a single lever handle and rocking rod has also been in common use prior to my present invention.

The rear ends of the levers 16 are pivotally connected with the levers 11 by means of links 25, so that the upward movement of the levers 16 in raising the tailboard 13 will also elevate the levers 11 and swing the pulverizing rake into the position shown in Fig. 1, substantially vertical above the axis of the beater which is its most efficient position, for the reason that in this position the manure raised by the teeth 4 will be thrown with considerable force against the teeth 8, and any material which is impeded in this movement by the teeth of the rake will fall directly downward upon the rotating beater, instead of accumulating in front of the beater as would be the case if the rake was inclined toward the forward end of the body, while, if the rake was inclined in the opposite direction, the manure would have a tendency to lodge upon the rake.

Whenever the tailboard 13 is lowered from the position shown in Fig. 1 to that shown by the broken lines 13ª in Fig. 3, the links 25 will cause the levers 11 to be swung into the position shown in Fig. 3, thereby rocking the rake upon the studs 12 and carrying it into a substantially horizontal position just above the sides of the body 1. In the lowered position of the rake 6, as shown in Fig. 3, the body may be conveniently loaded at the rear end, by throwing the manure over the beater and rake into the body 1.

The actuating mechanism for raising the tailboard and rake, as shown in Figs. 1, 2 and 3, is arranged to act directly upon the pivoted lever supporting the tailboard, and the simultaneous movement of the rake is secured by connecting the rake and tailboard through the lever 11 and link 25.

In Figs. 4 and 5 I have shown a modification of the actuating mechanism, which consists in journaling beneath the body a rocking shaft 28 having a raidial arm 29 attached to the shaft 28, and being pivotally connected by means of a link 30 with the lever 16, upon the free ends of which the tailboard 13 is suspended. The rocking shaft 28 is provided with a segmental wheel 31, on the periphery of which is wound a chain 32, connected with the arm 33 of a hand lever 34 in convenient position to be operated from the seat 2. The hand lever 34 is provided with a latch 35, arranged to engage notches 36 in the arc 37. The radial arm 29 is likewise connected by a link 38 with the frame of the rake 6. In Fig. 4 the rake and tailboard are both shown in a raised position. In order to depress the rake and tailboard, the lever handle 34 is depressed into the position shown in Fig. 5, thereby releasing the chain 32 and allowing the lever 16 and connected tailboard to fall by gravity into the position shown in Fig. 5, at the same time swinging the rake 6 toward the forward end of the spreader into a substantially horizontal position, over which the body of the spreader may be conveniently loaded.

In Fig. 6 I have shown still another modification, which consists in journaling two rocking shafts 39 and 40 at the front end of the spreader, said shafts having radial arms 41 and 42 which are operatively connected together by means of a link 43. The arm 41 is connected by a link 44 with the cam lever 19, by which the tailboard lever 16 is raised, and the radial arm 42 is connected by a link 45 to an arm 46 extending from the frame of the rake 6. The lever handle 47 is connected with the rocking shaft 39, and a simultaneous rocking motion is given to the two shafts 39 and 40 by the single movement of the lever 47, producing a simultaneous movement of the tailboard 13 and rake 6.

I do not wish to confine myself to any specific arrangement of parts whereby the tailboard and rake are operatively connected so as to be simultaneously actuated by the movement of a single lever handle, as this may be accomplished in different ways which will readily occur to a mechanic conversant with manure spreaders.

I am aware that it has been proposed to provide a shield for the beater and teeth of a pulverizing rake, all carried by a single framework and capable of being brought into and out of their operative position by a swinging movement around a common center. By this construction, however, when the rake is brought into its operative position, the tailboard is swung over the teeth of the beater and in position to impede the passage of manure against the teeth of the rake.

By my present invention, I swing the framework of the rake and the lever which support the tailboard upon independent centers, so that the rake and tailboard as they are raised or lowered will describe independent arcs of circles, each having a separate center. For example, the levers 16 carrying the tailboard rotate about a stud 17 and the framework of the rake rotates about the studs 12 so that, as the tailboard descends, the rake will swing toward the tailboard and be brought into a position over it, as shown in Fig. 3, and when the tailboard and rake are raised in their operative position a free path is provided for the manure, as it is lifted by the teeth of the beater and carried with violent impact against the teeth of the rake. Notwithstanding that the rake and tailboard are swung upon independent centers, I secure simultaneous movement of both the rake and tailboard through the operation of a single lever handle, by coupling the operative mechanism together at a convenient and suitable point; some of the most obvious methods of so coupling the tailboard and rake together having been shown in the different figures of the accompanying drawings.

I claim,

1. A manure spreader, having a beater, a rake and a tailboard, said rake and said tailboard pivotally supported on independent centers and arranged to be swung upon said centers into and out of operative position with reference to said beater, and means for positively swinging said rake and said tailboard simultaneously into and out of operative position.

2. A manure spreader, having a rake and a tailboard, each capable of movement about independent centers, and a lever handle positively connected with said rake and said tailboard, whereby said rake and said tailboard are simultaneously moved both into and out of operative position by the movement of said lever handle.

3. A manure spreader, having a beater, a rake and a tailboard, said rake and said tailboard pivotally supported on independent centers, a lever handle, and positive means for imparting the movement of said lever handle in one direction to raise simultaneously both said rake and said tailboard.

4. A manure spreader, having a rake and a tailboard pivotally supported upon independent centers, positive means for raising and lowering one of said members, and connecting means between said rake and said tailboard, whereby the positive movement of one is imparted positively to the other.

5. A manure spreader, having a rake and a tailboard pivotally supported upon independent centers, positive means for raising and lowering said rake, and a link connecting said rake and said tailboard, whereby positive movement of said rake is imparted positively to said tailboard.

6. A manure spreader, having a rake and a tailboard pivotally supported upon independent centers, and means for simultaneously lowering both said rake and said tailboard.

7. A manure spreader, having a beater and a rake comprising a bar having rake teeth, said bar held by arms pivotally supported on an axis approximately in the vertical plane of the axis of the beater, and means for raising said arms to bring said rake teeth into an approximately vertical plane and into operative relation with the beater and for lowering said arms to bring said rake teeth into a horizontal and inoperative position with relation to the beater.

8. A manure spreader, having a beater, a rake and a tailboard, said tailboard arranged to have a vertical movement and supported on swinging arms pivoted in front of said beater, said rake pivotally supported independently of said tailboard above said beater, means for raising and lowering said swinging arms, and a link connecting said swinging arms with said rake, whereby said rake is raised and lowered simultaneously with said tailboard.

Dated this 27th day of April 1908.

THEOPHILUS BROWN.

Witnesses:
PENELOPE COMBERBACH,
HENRY WOOD FOWLER.